(12) United States Patent
Martins (10) Patent No.: US 9,450,845 B2
(45) Date of Patent: Sep. 20, 2016

(54) QUALITY OF EXPERIENCE

(75) Inventor: Nuno Martins, Queluz (PT)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 228 days.

(21) Appl. No.: 14/110,720

(22) PCT Filed: Apr. 11, 2011

(86) PCT No.: PCT/EP2011/055605
§ 371 (c)(1),
(2), (4) Date: Jan. 15, 2014

(87) PCT Pub. No.: WO2012/139625
PCT Pub. Date: Oct. 18, 2012

(65) Prior Publication Data
US 2014/0185474 A1    Jul. 3, 2014

(51) Int. Cl.
| | |
|---|---|
| *H04L 12/26* | (2006.01) |
| *H04L 12/24* | (2006.01) |
| *H04L 1/20* | (2006.01) |
| *H04W 24/00* | (2009.01) |
| *H04W 28/18* | (2009.01) |

(52) U.S. Cl.
CPC ............ *H04L 43/0829* (2013.01); *H04L 1/20* (2013.01); *H04L 41/5009* (2013.01); *H04W 24/00* (2013.01); *H04W 28/18* (2013.01)

(58) Field of Classification Search
CPC . H04L 41/5009; H04L 43/0829; H04L 1/20; H04W 28/18; H04W 24/00
See application file for complete search history.

(56) References Cited

U.S. PATENT DOCUMENTS

| | | | | |
|---|---|---|---|---|
| 8,391,543 | B1* | 3/2013 | Verma ................... | G06F 21/556 283/113 |
| 2008/0104228 | A1 | 5/2008 | Dacosta | |
| 2012/0281142 | A1* | 11/2012 | Pettersson ............ | H04N 17/004 348/553 |

FOREIGN PATENT DOCUMENTS

| | | |
|---|---|---|
| EP | 1763248 A1 | 3/2007 |
| JP | 2006-033722 A | 2/2006 |

(Continued)

OTHER PUBLICATIONS

Khan et al. "Video Quality Assessment as Impacted by Video Content over Wireless Networks," 2009, International Journal on Advances in Networks and Services.*
Japanese Office Action Notice of Reasons for Rejection application No. 2014-504170 dated Dec. 3, 2014.

(Continued)

*Primary Examiner* — Jae Y Lee
(74) *Attorney, Agent, or Firm* — Squire Patton Boggs (US) LLP (57) ABSTRACT

The invention relates to an apparatus comprising: at least one processor and at least one memory including a computer program code, the at least one memory and the computer program code configured to, with the at least one processor, cause the apparatus at least to: search for packet losses; determine a type of a frame wherein at least one packet loss took place and amount of lost information; determine events affecting user experience based on the type of the frame and the amount of lost information; estimate a first quality indicating parameter for each of the events affecting user experience, wherein the first quality parameter comprises objective quality information, and estimate a second quality indicating parameter by using the first quality indicating parameter, wherein the second quality indicating parameter comprises subjective quality information.

16 Claims, 2 Drawing Sheets

(56) References Cited

FOREIGN PATENT DOCUMENTS

| | | |
|---|---|---|
| JP | 2007-019802 A | 1/2007 |
| WO | 2009/087863 A1 | 7/2009 |
| WO | WO 2010/000946 A1 | 1/2010 |

OTHER PUBLICATIONS

International Search Report and Written Opinion dated Dec. 28, 2011 corresponding to International Patent Application No. PCT/EP2011/055605.

* cited by examiner

QUALITY OF EXPERIENCE

FIELD

The invention relates to apparatuses, a method, system, computer program, computer program product and computer-readable medium.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Several metrics may be used for assessing quality of services, such as availability, packet losses or delays. These typically belong to the Quality of Service, (QoS), class of metrics. When media communications are considered, the perceived quality is typically evaluated in terms of Quality of Experience (QoE).

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: search for packet losses; determine a type of a frame wherein at least one packet loss took place and amount of lost information; determine events affecting user experience based on the type of the frame and the amount of lost information; estimate a first quality indicating parameter for each of the events affecting user experience, wherein the first quality parameter comprises objective quality information, and estimate a second quality indicating parameter by using the first quality indicating parameter, wherein the second quality indicating parameter comprises subjective quality information.

According to yet another aspect of the present invention, there is provided a method comprising: searching for packet losses; determining a type of a frame wherein at least one packet loss took place and amount of lost information; determining events affecting user experience based on the type of the frame and the amount of lost information; estimating a first quality indicating parameter for each of the events affecting user experience, wherein the first quality parameter comprises objective quality information, and estimating a second quality indicating parameter by using the first quality indicating parameter, wherein the second quality indicating parameter comprises subjective quality information.

According to yet another aspect of the present invention, there is provided an apparatus comprising: means for searching for packet losses; means for determining a type of a frame wherein at least one packet loss took place and amount of lost information; means for determining events affecting user experience based on the type of the frame and the amount of lost information; means for estimating a first quality indicating parameter for each of the events affecting user experience, wherein the first quality parameter comprises objective quality information, and means for estimating a second quality indicating parameter by using the first quality indicating parameter, wherein the second quality indicating parameter comprises subjective quality information.

According to yet another aspect of the present invention, there is provided a computer program embodied on a computer-readable storage medium, the computer program comprising program code for controlling a process to execute a process, the process comprising: A computer program embodied on a computer-readable storage medium, the computer program comprising program code for controlling a process to execute a process, the process comprising: searching for packet losses determining a type of a frame wherein at least one packet loss took place and amount of lost information; determining events affecting user experience based on the type of the frame and the amount of lost information estimating a first quality indicating parameter for each of the events affecting user experience, wherein the first quality parameter comprises objective quality information, and estimating a second quality indicating parameter by using the first quality indicating parameter, wherein the second quality indicating parameter comprises subjective quality information.

LIST OF DRAWINGS

Some embodiments of the present invention are described below, by way of example only, with reference to the accompanying drawings, in which.

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments. In the following, different exemplifying embodiments will be described using, as an example of an access architecture to which the embodiments may be applied, a radio access architecture based on LTE Advanced, LTE-A, that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. For example, the embodiments are applicable to both frequency division duplex (FDD) and time division duplex (TDD).

In an orthogonal frequency division multiplexing (OFDM) system, the available spectrum is divided into multiple orthogonal sub-carriers. In OFDM systems, available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule transmissions to user devices. Required information is usually signalled to the (e)NodeB.

Figure 1:
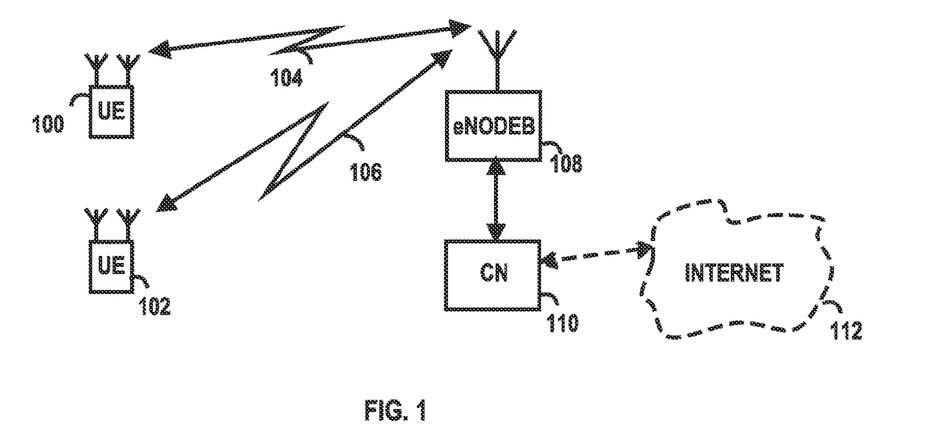
FIG. 1 illustrates an example of a system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with the necessary properties. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS).

FIG. 1 shows a part of a radio access network of E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104, 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to a base station, an access point or any other type of interfacing device including a relay station capable of operating in a wireless environment.

The (e)NodeB includes transceivers, for entity. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112.

The user device (also called UE, user equipment, user terminal, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1A) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeB 108 of FIG. 1 may provide any kind of these cells. A cellular radio system may be implemented as a multilayer network including several kinds of cells. Typically, in multilayer networks, one node B provides one kind of a cell or cells, and thus a plurality of node Bs are required to provide such a network structure.

Quality of Experience (QoE) is a means for assessing quality for media communication. The "traditional" metrics, Quality of Service (QoS), is often inappropriate for obtaining a real picture of user experience. The QoE is designed to examine elements or parameters that influence a user's perception of the service at issue. The QoE may be applied to a wide range of multimedia communications services, such as conveying video.

In delivering multimedia contents, several elements in the delivery chain are typically used and some of them introduce distortion. These include an encoding and delivery (network distribution) process. A plurality of approaches may be adopted in evaluating perceived quality, namely, full reference, reduced reference and non-reference methods. Most of the proposed objective quality metrics assume the full availability of a source signal to be compared with a received (distorted) signal and are considered full reference models. Also another type of quality assessment exists, in which a received (distorted) signal is compared with chosen features extracted from a source signal. This is known as a reduced reference approach. The non-reference quality assessment assumes that no information about a reference signal is available. It is understood that not all of these methods are feasible in assessing quality after delivering content, since the source content is typically not available.

As to multimedia contents delivered to an end device, the measuring of the QoE is a challenging process. On one hand, a source signal is not available for comparison, and even if it were, the processing power of an end device is usually prohibitive to make such an assessment. On the other hand, measurable metrics are typically in relation to network or service performance thus not allowing assessing the perceived quality.

Figure 2:
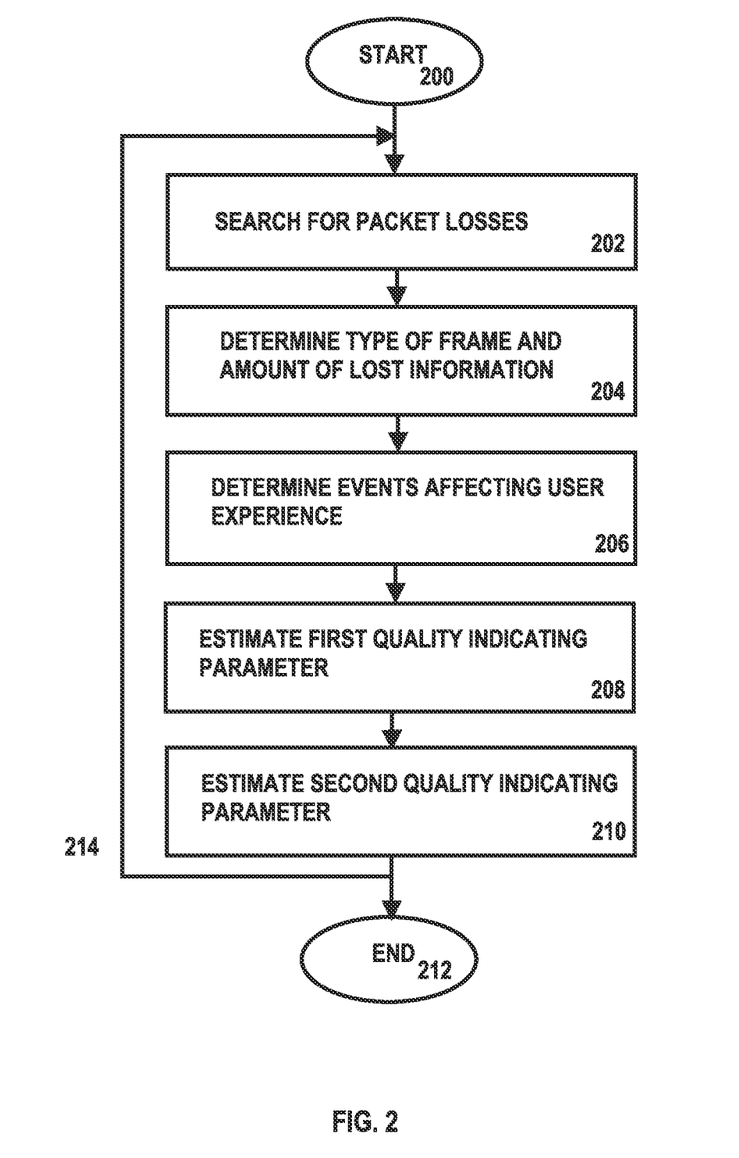
FIG. 2 is a flow chart.

In the following, some embodiments are disclosed in further details in relation to FIG. 2. The embodiment of FIG. 2 is usually related to a base station, node, host, server or any other network element, or user device. In an embodiment, a mean opinion score (MOS) for a video streaming service is evaluated in the case a video stream is delivered through a content delivery network (CDN). A value range set to a MOS is typically from 1 (bad) to 5 (excellent), allowing the qualification of the quality of a content delivered to an end device. Different approaches may be used for assessing a MOS. These may be classified into media layer models in which the quality is assessed by inspecting media contents (audio, video, voice) by requiring significant processing power, parametric models based on parameters obtained from a network or devices, such as a packet loss, jitter or delay, or bit stream models that use bit stream information combined with packet layer data.

For measuring a MOS during a video streaming delivery process two approaches may be considered feasible: reduced reference and non-reference. Considering that resources are scarce in network elements as well as in end devices, the approach taken herein as an example is the non-reference one. Therefore, a MOS assessment using network performance metrics, i.e. parametric models, is used in the following embodiment. The evaluation may be carried out in the backend (in which case network information is obtained from network elements and/or end devices). Computational load introduced by parametric models is usually insignificant as they utilize network performance data to assess a MOS and thus there is no need to inspect the bit stream or the media content itself.

The embodiment starts in block 200.

In block 202, packet losses are searched for.

The determination of the packet loss may be carried out by searching for packet sequence numbering discontinuities. For example, real-time transport protocol (RTP) headers have sequence numbering suitable for identifying discontinuities in packet delivery.

In block 204, the type of a frame wherein at least one packet loss took place and the amount of lost information are determined.

The type of a frame may be estimated on the basis of information on a RTP header, i.e. at a transport layer. An end device may obtain this information while decoding a protocol stack. Network elements may use for example deep packet inspection analysers. The RTP header typically contains information about the packet's timestamp. Packets belonging to a same frame have the same timestamp and therefore the timestamp may be used to identify which packets belong to the same frame. The type of a frame is usually either I, P or B.

Determining the type of a frame a packet belongs to is important, since sizes of I, P and B frames differ from each other. Information on the average frame size may be collected for a short period of time, for example for a few seconds. Different ranges determine to which frame type a certain frame size belongs. Determining the amount of information lost may be carried out on the basis of an average frame size (for a particular frame type) of recently sent frames.

In block 206, events affecting user experience are determined based on the type of the frame and the amount of lost information.

The type of a frame and the amount of lost information indicate error propagation. The information about packet losses and error propagation are used to determine whether the packet loss affects the quality of user experience. It should be appreciated, that impairments in different frames do not affect equally the experience level. While a distortion of an I or P-frame propagates to other frames, a distortion in a B-frame does not affect any other frame. While assessing packet lost effect, two parameters, namely error propagation time (EPT) and data error ratio (DER) are taken into consideration.

An EPT is defined as a time an error (an error is related to a packet lost event) is visible. For this the human eye detection time is taken as a lower limit an error must be visible to be detected by a user. That may for example be 66,67 ms.

A DER is considered as a ratio between the lost information of a frame and a total size of the frame.

In block 208, a first quality indicating parameter for each of the events affecting user experience is estimated, wherein the first quality parameter comprises objective quality information.

Typically, more than one events affecting user experience exist and a first quality indicating parameter is estimated for each of them.

The first quality indicating parameter may be a peak signal-to-noise ratio (PSNR). The PSNR is often used as a quality measurement between an original and encoded and/or compressed video image.

Above, events affecting user experience and the amount of lost information are determined. As already stated above, each event when quality of experience is deteriorated has two properties: EPT and DER parameters. These properties are transformed into an objective quality metric, for example PSNR. Information on the type of a frame a packet loss corresponds to and a DER are mapped to a transfer matrix including values for each frame type. Table 1 shows one example of a transfer matrix. DER values are typically given as percentages.

TABLE 1

|      | I   | P   | B   |
|------|-----|-----|-----|
| DER1 | P11 | P12 | P13 |
| DER2 | P21 | P22 | P23 |
| DER3 | P31 | P32 | P33 |
| DER4 | P41 | P42 | P43 |
| DER5 | P51 | P52 | P53 |
| DER6 | P61 | P62 | P63 |

P-values in the table are PSNR values which typically are given as decibels. A peak signal-to-noise ratio (PSNR) may be defined as the ratio between the maximum possible power of a signal and the power of noise that affects the reliability of values estimated from a received signal. For example, PSNR may be defined for two video images by first determining mean squared error (MSE) for these two video images (or selected pixels in the images) when one of the images is considered to be an approximation of the other. In a simplified manner, the MSE describes differences between the two video images. If the images are identical, MSE is zero. The PSNR is often used as a quality measurement between an original and encoded and/or compressed video image. The higher the PSNR, the better the quality. PSNR may be determined as follows:

$$PSNR = 20 \cdot \log_{10}\left(\frac{MAX_I}{\sqrt{MSE}}\right), \quad (1)$$

wherein
$MAX_I$ denotes a maximum possible pixel value of a video image,
$\sqrt{MSE}$ denotes a square root operation of a mean squared error value between two corresponding pixels, and
$\log_{10}$ is a 10-base logarithmic function.

For Equation (1), an MSE may also be a sum over all squared value differences divided by image size and by three (number of colour parameters used in video coding). Embodiments do not limit the method used for determination of PSNR values for a transfer matrix. The Equation (1) shows only one example. The transfer matrix may be made in advance based on earlier analysis or simulations and it may be updated later as many times as needed. The transfer matrix may be stored in a suitable memory unit.

An example: a PSNR value for a quality degradation event may be determined as follows: first, it is checked, whether the duration of the event is long enough (longer than the lower limit), and if it is, a data error rate is determined as well as the type of a frame. Then a PSNR value is fetched from a pre-calculated transfer table by using the data error rate value and the type of the frame (for example, DER2 and P). Data error rates are typically given as ranges to save memory space.

A PSNR value usually indicates distortion introduced to a quality degradation event at issue. Since the duration is also determined, it is also possible to obtain information on the propagation time of the event.

In block 210, a second quality indicating parameter is estimated by using the first quality indicating parameter, wherein the second quality indicating parameter comprises subjective quality information.

Typically, more than one events affecting user experience exist and a second quality indicating parameter is estimated for each of them.

In multimedia services, such as audio or video stream conveyance, a mean opinion score (MOS) provides a numerical indication of the perceived quality of reception after compression and/or transmission.

In an embodiment, a PSNR value is transferred into a MOS distortion value. Typically, for each event affecting user experience, a PSNR value and thus a MOS value are determined. Hence, PSNR and MOS values are usually event-specific.

In European Patent Application EP 1 763 248, transfer functions for obtaining a MOS value from a PSNR value are presented. This teaching is taken herein as a reference. The EP 1 763 248 patent publication discloses two possibilities, one for MPEG-4 coding and another one for H264 coding:

$$MeanScore_{MPEG4\_SP} = 0.5249\sqrt{\frac{PSNR}{13.37}} \quad (2)$$

$$MeanScore_{H264\_SP} = 0.5488\sqrt{\frac{PSNR}{13.17}},$$

wherein
PSNR denotes a PSNR value as a first quality indicating parameter, and
$\sqrt{\phantom{x}}$ denotes a square root operation.

Transfer functions for other coding schemes may be deduced correspondingly (see EP 1763 248).

In this manner distortion in terms of MOS and its behaviour as a function of time may be estimated. Thus perceived quality may be assessed by using MOS (subjective QoE metric) information for improving customer service (by using for example bit rate optimization, adopt forward error correction mechanisms or retransmission techniques). The embodiment ends in block 212. The embodiment is repeatable in many ways. One example is shown by arrow 214 in FIG. 2.

The steps/points, signaling messages and related functions described above in FIG. 2 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

It should be understood that conveying, transmitting and/or receiving may herein mean preparing a data conveyance, transmission and/or reception, preparing a message to be conveyed, transmitted and/or received, or physical transmission and/or reception itself, etc on a case by case basis.

An embodiment provides an apparatus which may be any node, host, server, user device or any other suitable apparatus capable to carry our processes described above in relation to FIG. 2.

Figure 3:
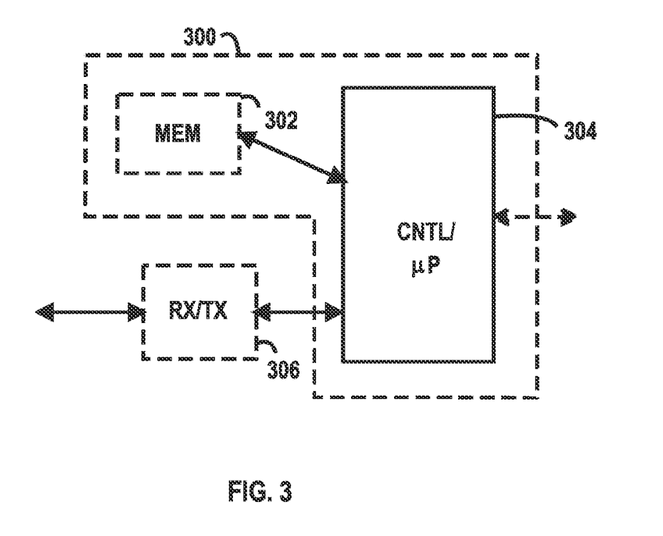
FIG. 3 illustrates examples of an apparatus.

FIG. 3 illustrates a simplified block diagram of an apparatus according to an embodiment especially suitable for obtaining information on the quality of user experience.

As an example of an apparatus according to an embodiment, it is shown an apparatus 300, such as a node device, host, server or user device, including facilities in a control unit 304 (including one or more processors, for example) to carry out functions of embodiments, such as estimating quality parameters. This is depicted in FIG. 3.

An optional block 306 includes parts/units/modules need for reception and transmission, usually called a radio front end, RF-parts, radio parts, etc. Some apparatuses may communicate via a radio path, some via a fixed line, some by using both. Thus the apparatus may not necessarily always be coupled to radio parts, or does not include them.

Another example of an apparatus 300 may include at least one processor 304 and at least one memory 302 including a computer program code, the at least one memory and the computer program code configured to, with the at least one processor, cause the apparatus at least to: search for packet losses; determine a type of a frame wherein at least one packet loss took place and amount of lost information; determine events affecting user experience based on the type of the frame and the amount of lost information; estimate a first quality indicating parameter for each of the events affecting user experience, wherein the first quality parameter comprises objective quality information, and estimate a second quality indicating parameter by using the first quality indicating parameter, wherein the second quality indicating parameter comprises subjective quality information.

Yet another example of an apparatus comprises means 304 for searching for packet losses, means 304 for determining a type of a frame wherein at least one packet loss took place and amount of lost information, means 304 for determining events affecting user experience based on the type of the frame and the amount of lost information, means 304 for estimating a first quality indicating parameter for each of the events affecting user experience, wherein the first quality parameter comprises objective quality information, and means 304 for estimating a second quality indicating parameter by using the first quality indicating parameter, wherein the second quality indicating parameter comprises subjective quality information.

Yet another example of an apparatus comprises a searcher configured to search for packet losses; a first determining unit configured to determine a type of a frame wherein at least one packet loss took place and amount of lost information; a second determining unit configured to determine events affecting user experience based on the type of the frame and the amount of lost information; a first estimator configured to estimate a first quality indicating parameter for each of the events affecting user experience, wherein the first quality parameter comprises objective quality information, and a second estimator configured to estimate a second quality indicating parameter by using the first quality indicating parameter, wherein the second quality indicating parameter comprises subjective quality information.

Although the apparatuses have been depicted as one entity in FIG. 3, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be a software application, or a module, or a unit configured as arithmetic operation, or as a program (including an added or updated software routine), executed by an operation processor. Programs, also called program products or computer programs, including software routines, applets and macros, can be stored in any apparatus-readable data storage medium and they include program instructions to perform particular tasks. Computer programs may be coded by a programming language, which may be a high-level programming language, such as objective-C, C, C++, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above.

Other embodiments provide computer programs embodied on a computer readable medium, configured to control a processor to perform embodiments of the methods described above.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processor and at least one memory including a computer program code, the at least one memory and the computer program code configured to, with the at least one processor, cause the apparatus at least to:
search for packet losses;
determine a type of a frame wherein at least one packet loss took place and amount of lost information;
determine events affecting user experience based on the type of the frame and the amount of lost information;
estimate a first quality indicating parameter for each of the events affecting user experience, wherein the first quality parameter comprises objective quality information, and
estimate a second quality indicating parameter by using the first quality indicating parameter, wherein the second quality indicating parameter comprises subjective quality information,
wherein the first quality indicating parameter is a peak signal-to-noise ratio (PSNR) value,
wherein the PSNR is defined as a ratio between a maximum possible power of a signal and a power of noise that affects the reliability of values estimated from a received signal,
wherein the determination of events affecting user experience is carried out based on Error Propagation Time (EPT) and Data Error Ratio (DER) parameters,
wherein the at least one memory and the computer program code are further configured to, with the at least one processor, cause the apparatus at least to transform the EPT and DER into PSNR as an objective quality metric, and
wherein the at least one memory and the computer program code are further configured to, with the at least one processor, cause the apparatus at least to map information on the type of a frame a packet loss corresponds to and the DER to a transfer matrix including values for each frame type.

2. The apparatus of claim 1, wherein the searching for packet losses is based on searching for packet sequence numbering discontinuities.

3. The apparatus of claim 1, wherein the determination of the type of the frame is based on classification frames into either I, P or B types.

4. The apparatus of claim 1, wherein the peak signal-to-noise ratio value is obtained by mapping the type of the frame wherein the at least one packet loss took place and a Data Error Rate to a transfer matrix including values for each frame type.

5. The apparatus of claim 1, wherein the estimating the second quality parameter is carried out by applying a transfer function for obtaining a mean opinion score (MOS) value from the peak signal-to-noise (PSNR) value.

6. The apparatus of claim 1, the apparatus comprising a server, host, node or user device.

7. A method comprising:
searching for packet losses;
determining a type of a frame wherein at least one packet loss took place and amount of lost information;
determining events affecting user experience based on the type of the frame and the amount of lost information;
estimating a first quality indicating parameter for each of the events affecting user experience, wherein the first quality parameter comprises objective quality information, and
estimating a second quality indicating parameter by using the first quality indicating parameter, wherein the second quality indicating parameter comprises subjective quality information,
wherein the first quality indicating parameter is a peak signal-to-noise ratio (PSNR) value,
wherein the PSNR is defined as a ratio between a maximum possible power of a signal and a power of noise that affects the reliability of values estimated from a received signal,
wherein the determination of events affecting user experience is carried out based on Error Propagation Time (EPT) and Data Error Ratio (DER) parameters,
wherein the method further comprises transforming the EPT and DER into PSNR as an objective quality metric, and
wherein the method further comprises mapping information on the type of a frame a packet loss corresponds to and the DER to a transfer matrix including values for each frame type.

8. The method of claim 7, wherein the searching for packet losses is based on searching for packet sequence numbering discontinuities.

9. The method of claim 7, wherein the determination of the type of the frame is based on classification frames into either I, P or B types.

10. The method of claim 7, wherein the peak signal-to-noise ratio value is obtained by mapping the type of the frame wherein the at least one packet loss took place and a Data Error Rate to a transfer matrix including values for each frame type.

11. The method of claim 7, wherein the estimating the second quality parameter is carried out by applying a transfer function for obtaining a mean opinion score (MOS) value from the peak signal-to-noise (PSNR) value.

12. A computer program embodied on a non-transitory computer-readable storage medium, the computer program when executed by a processor, causes the processor to execute a process, the process comprising:
searching for packet losses;
determining a type of a frame wherein at least one packet loss took place and amount of lost information;
determining events affecting user experience based on the type of the frame and the amount of lost information;
estimating a first quality indicating parameter for each of the events affecting user experience, wherein the first quality parameter comprises objective quality information, and
estimating a second quality indicating parameter by using the first quality indicating parameter, wherein the second quality indicating parameter comprises subjective quality information
wherein the first quality indicating parameter is a peak signal-to-noise ratio (PSNR) value,
wherein the PSNR is defined as a ratio between a maximum possible power of a signal and a power of noise that affects the reliability of values estimated from a received signal, wherein the determination of events affecting user experience is carried out based on Error Propagation Time (EPT) and Data Error Ratio (DER) parameters, wherein the process further comprises transforming the EPT and DER into PSNR as an objective quality metric, and wherein the process further comprises mapping information on the type of a frame a packet loss corresponds to and the DER to a transfer matrix including values for each frame type.

13. The computer program of claim 12, wherein the searching for packet losses is based on searching for packet sequence numbering discontinuities.

14. The computer program of claim 12, wherein the determination of the type of the frame is based on classification frames into either I, P or B types.

15. The method of claim 12, wherein the peak signal-to-noise ratio value is obtained by mapping the type of the frame wherein the at least one packet loss took place and a Data Error Rate to a transfer matrix including values for each frame type.

16. The method of claim 12, wherein the estimating the second quality parameter is carried out by applying a transfer function for obtaining a mean opinion score (MOS) value from the peak signal-to-noise (PSNR) value.

* * * * *